United States Patent [19]

Duvenkamp

[11] Patent Number: 4,711,494
[45] Date of Patent: Dec. 8, 1987

[54] FOLDABLE HEADREST FOR VEHICLE REAR SEAT

[75] Inventor: Manfred Duvenkamp, Trebur-Geinsheim, Fed. Rep. of Germany

[73] Assignee: General Motors Corporation, Detroit, Mich.

[21] Appl. No.: 939,176

[22] Filed: Dec. 8, 1986

[30] Foreign Application Priority Data

Feb. 22, 1986 [DE] Fed. Rep. of Germany ....... 3605774

[51] Int. Cl.$^4$ .............................................. A47C 1/10
[52] U.S. Cl. .................................... 297/403; 297/408
[58] Field of Search ...................... 297/403, 391, 408; 280/751; 296/63

[56] References Cited

U.S. PATENT DOCUMENTS 4,623,166 11/1986 Andres et al. ................. 297/403 X

FOREIGN PATENT DOCUMENTS

| 3103620 | 3/1981 | Fed. Rep. of Germany . | |
| 3136648 | 3/1983 | Fed. Rep. of Germany . | |
| 440928 | 10/1948 | Italy | 297/403 |
| 0014530 | 1/1984 | Japan | 297/403 |
| 699899 | 11/1953 | United Kingdom | 297/403 |
| 2132479 | 11/1984 | United Kingdom | 297/403 |

*Primary Examiner*—James T. McCall
*Attorney, Agent, or Firm*—Charles E. Leahy

[57] ABSTRACT

The headrest for a rear seat is fastened to two rods which are adapted for sliding movement in guide sleeves mounted in the backrest of a motor vehicle. The rods are comprised of an upper rod portion and a lower rod portion which are interconnected by a pivot joint. Upon actuation of a push button, the rods are urged by a lift mechanism out of the guide sleeve into a position where the pivot joints are unlocked and wherein the headrest together with the upper rod portion is folded down into a storage position so as to afford the drive of the vehicle an unobstructed view to the rear.

8 Claims, 17 Drawing Figures

FOLDABLE HEADREST FOR VEHICLE REAR SEAT

The invention relates to a foldable headrest assembly for a vehicle seat, especially for the rear seat of a motor vehicle, wherein the headrest is supported by at least one bar projecting out of a sleeve-like guide means at the upper side of the backrest, and including a pivot joint which can be unlocked to enable the upper portion of the bar to be folded down.

BACKGROUND OF THE INVENTION

A headrest of the type described above has been disclosed in German Offenlegungsschrift DE-OS No. 31 03 620 for use with rear seats of station wagons. This prior art headrest is secured to an arm which is provided with a pivot joint and which in the head support position of the headrest is pulled by a tension-type coil spring into the sleeve member to a point where the pivot joint is locked and the headrest is sufficiently secured into position. The headrest is moved forwardly into a storage position by lifting the arm manually until the pivot joint is located above the edge of the backrest of the seat, whereupon the arm can be pivoted through an angle of 90°. The tension-type spring is secured at a location above the pivot joint and thereby retains the headrest in the storage position. The disadvantage of this prior art headrest is that the fold-down operation is awkward, because the headrest must be raised against the force of the tension-type spring until the pivot joint is exposed before the headrest can be folded down. When the vehicle is fully loaded, it is difficult to fold down the headrest from any place other than the rear seat.

German Offenlegungsschrift DE-OS No. 31 36 648 discloses another headrest arranged inside the backrest of a motor vehicle seat which, through the use of a servo mechanism, is automatically pivoted into the head support position when the weight of the seat user is applied to the seat cushion of the associated vehicle seat, and is automatically returned into the storage position when the weight is removed, i.e., when the occupant leaves the seat. This arrangement provides that the headrest is in the head support position only when the seat is occupied. Since the headrest, during the time the seat is unoccupied, is in a lowered position, the driver of the vehicle is afforded a better view towards the rear. The power mechanism for this headrest includes an electric motor and a pinion gear which is in engagement with a gear segment. The gear segment is fixedly connected to the frame of the backrest, and the headrest is adapted for pivoting movement about the gear segment shaft disposed inside the headrest. The disadvantage of this prior art arrangement is that is it relatively complicated and expensive to manufacture, and that a special type of headrest is required which cannot always be replaced by a headrest of the ordinary type. Another disadvantage is that this headrest cannot completely be moved out of the field of view of the driver since it is pivoted only from its mounting position on top of the seat.

It is the object of the present invention to provide a foldable headrest of the type described above which is relatively simple in design and easy to operate, and which can be folded down to a position which is low enough to afford the driver of the vehicle an unobstructed view towards the rear.

In accordance with the invention, this object is achieved in that a push button actuated displacement mechanism is provided through which the pivot joint can be unlocked, and in that the bar, or an upper portion thereof, together with headrest can be automatically folded down.

The invention enables that, upon actuation of a push button, which may be disposed on the backrest of the seat or, for instance, on the dashboard, the headrest can be automatically moved from the head support position to the storage position in which the headrest is located below the upper edge of the backrest so as to afford the vehicle operator an unobstructed view towards the rear. Return movement of the headrest into the head support position is carried out, preferably, manually, with the displacement mechanism being activated at the same time. This arrangement provides an adjusting device which is easy to operate and which enables, if desired, automatic tilting of the headrest.

SUMMARY OF THE INVENTION

According to a preferred arrangement of the invention, the pivot joint, which is arranged at the end of one of the bar portions, is adapted for slidable insertion into the sleeve-like guide means, and this arrangement of the pivot joint with the sleeve-like guide means renders the pivot joint lockable. To enable the headrest to be folded down, it is only necessary for the pivot joint to be lifted out of the sleeve-like guide means by means of the displacement device. The pivot joint is formed in a simple manner in that one bar portion has a bifurcated end which is adapted to receive the flattened end of a second bar portion, with both ends being interconnected through a pivot pin which extends through a transverse bore. The preferred arrangement is one wherein, when the headrest is in the head support position, the interengaging end faces of the bar portions are in abutting relationship with each other. This arrangement will provide that the headrest is properly aligned when being pivoted back into the upright position prior to insertion of the pivot joint into the guide means.

To render the displacement device relatively simple in structure, the invention proposes that it be comprised of a spring which is arranged in the sleeve-like guide means and which can be preloaded. This spring is adapted to serve as a means by which the post can be lifted out of the guide means to the point where the pivot joint is in the unlocked position. Preferably, the support bar can be locked into position against the bias of the spring through a latching device. The invention proposes that a push button be provided through which the latching element of the latching device can be released. According to an alternative arrangement proposed by the invention, the means for releasing the latching device is in the form of a solenoid which is adapted to act on the latching element and which can be energized through an electric circuit arranged in the vehicle. This arrangement enables the headrest to be operated by remote control, as for instance from the dashboard.

In accordance with the invention, means are provided to enable the seat occupant to adjust the headrest, in a relatively simple manner, to the proper height. This is accomplished in that the headrest support bar can be locked through the latching device into a plurality of positions of varying insertion depth. This arrangement will enable that when the headrest is pivoted into its upright position, it can simultaneously be adjusted to the proper height. If the headrest is inadvertently pushed too deep into the guide means, actuation of the push button will enable the latching device to be temporarily released and the headrest to be lifted up. The invention also provides that the portion of the headrest support bar below the pivot joint can be locked through a latching device into a position in which the upper portion of the headrest support bar together with the headrest can be folded down. The latching device prevents the lower bar portion from extending too far out of the guide means when the headrest is being folded down. It also enables the headrest to be removed from the backrest to facilitate cleaning or repair operations.

Preferably, the sleeve-like guide means is in the form of a tubular member which is adapted to be mounted interiorly of the backrest. Said tubular member is provided with a head which is substantially flush with the upper edge of the backrest. The head of the tubular member has formed thereon adjacent its bore a rearwardly open recess into which the headrest support bar is insertable when the headrest is folded down. A guide means of this type is relatively simple and inexpensive in construction and, when the headrest is in the storage position, serves as a shield for the pivot joint. Furthermore, it can be harmoniously integrated into the backrest. To assist in the operation of folding down the headrest after the pivot joint is unlocked, a thrust element may be arranged in the wall of the head opposite the forwardly facing side of the support bar. The thrust element, which is exerting a pressure on the support bar in the fold-down direction at a location above the unlocked pivot joint, may be in the form of a tappet-like element which can be inserted against the force of a compression spring into a transverse bore formed in the wall of the head.

Preferably, the headrest support bar is retained in its rest position by an elastomeric member which is arranged so as to partially surround the bar. This arrangement will assist in controlling vibrations and noise which may be generated by the headrest when the vehicle is traveling on roads with irregular pavement. The elastic member may be fitted into the recess formed in the head of the guide means.

According to another advantageous feature, the lower rod portion is in the form of a toothed rack into which is engaging a pinion gear of an electrically driven mechanism which is mounted inside the backrest. The advantage of this refinement is that an electric control signal can be used to move the headrest into the storage position and from the storage position back into the head support position, and that the height of the headrest is adjustable. This will provide an arrangement which enables, through relatively simple means, remote control operation of the headrest and which is characterized by its high convenience factor.

Alternatively, electric remote control of the headrest can be realized in that the lower end of the support rod is fastened to a gear which is mounted in the backrest and which is rotated by means of an electrically driven screw of the self-locking type. This arrangement, too, enables the headrest to be folded down and to be erected through actuation of the electric drive means. Another advantage of this embodiment is that the headrest can be folded down without having to be raised up first to unlock the pivot joint, so that the space needed for folding down the headrest is relatively small. Preferably, in this embodiment the electrically driven screw is arranged upright in the backrest to facilitate installation operations.

All headrest arrangements described in the foregoing are suitable for mounting on one or two support bars of like configuration arranged in the backrest. If only one bar is used for the support of the headrest, some additional means must be provided to prevent the bar from turning in the backrest.

Other details and advantages will become apparent from the following description of several preferred embodiments which are illustrated in the drawings.

DESCRIPTION OF THE PREFERRED EMBODIMENT

Figure 1:
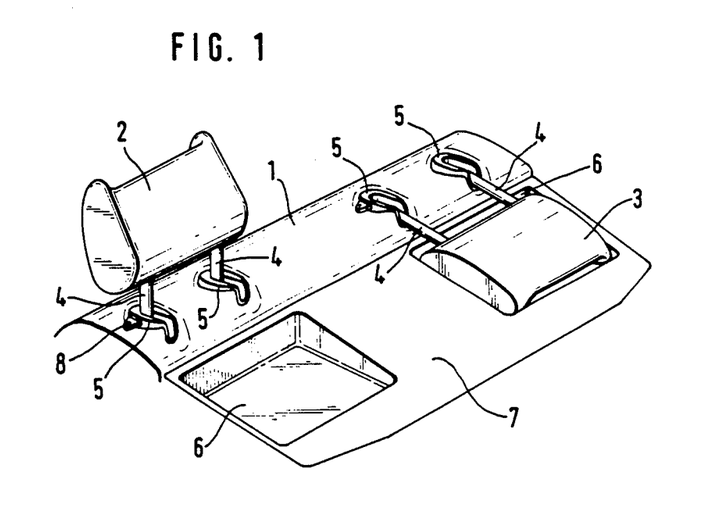
FIG. 1 is a perspective view of the backrest of a rear seat of a passenger car with the headrests according to the invention, one of them being shown in the head support position and the other one in the storage position.

In FIG. 1, numeral 1 designates the backrest of the rear seat of a passenger car which has mounted therein the two headrests 2, 3. Each headrest is retained by two support bars 4 in guide sleeves 5 which are arranged substantially vertically in the backrest 1. The guide sleeves 5 have heads 10 which are disposed at the upper edge of the backrest 1. The headrest 2 is in an upright head support position. The headrest 3 is in the storage position in which it is folded down and recessed behind the backrest 1. When the headrest is in this position, the rear view of the vehicle driver is not obstructed. The procedure of folding down the headrests 2, 3 is initiated in that an operating lever 8 is actuated which causes an adjustment device to be unlocked so that the support bar 4 can be raised a certain distance out of the guide sleeve 5 and folded down into the storage position.

Figure 2:
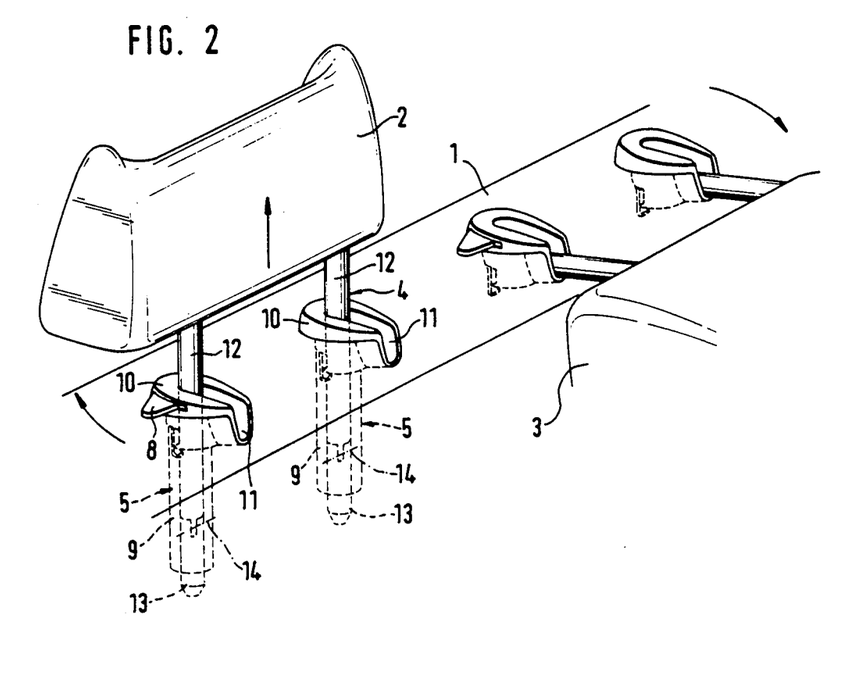
FIG. 2 a perspective view of the mounting arrangement of according to FIG. 1.

FIG. 2 illustrates how the bars 4 and guide sleeves 5 are inter-engaging. The guide sleeves 5 are comprised of a tubular member 9 having secured thereto a head 10 with a recess 11 which adjoins the bore of tubular member 9 and which has an open end pointing in the direction of the utility shelf 7 so as to form a guide means for the bar 4 when the headrest 2 or 3 is being folded down. The tubular member 9 and the head 10 are made of a plastic material.

Each headrest support bar 4 is comprised of an upper portion 12 to which is fastened the headrest 2 or 3, and a lower portion 13. The two portions are interconnected by a pivot joint 14. The bars 4 can be locked in the tubular members into the desired head support position by a latching mechanism which can be released by the operating lever 8. Upon unlocking of the latching mechanism, which is effected by the operating lever 8, the support bars 4 will be urged upwardly by compression-type springs until the pivot joints 14 are in the recesses 11 of the heads 10. This will cause unlocking of the pivot joints 14, which will enable the upper bar portions 12 together with the headrests 2, 3 secured thereto to be folded down rearwardly of the backrest.

Figure 3:
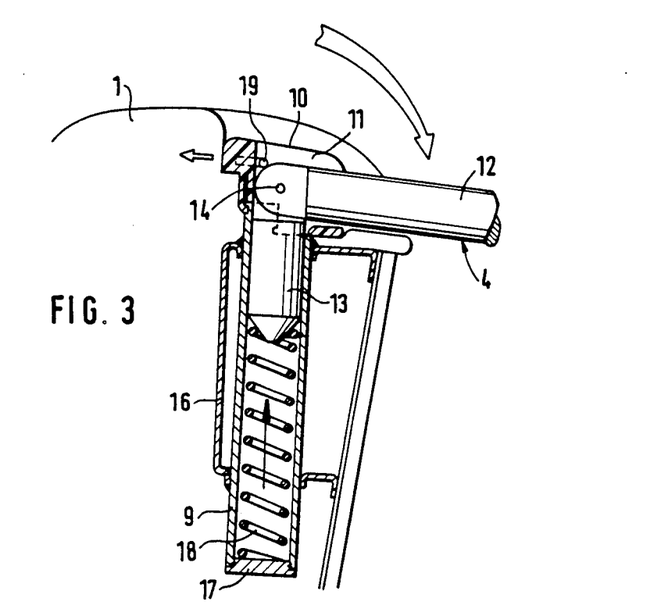
FIG. 3 is a longitudinal sectional view of the mounting arrangement of the headrest according to FIG. 1.

In the exemplary embodiment illustrated in FIG. 3, the guide sleeve 5 includes a tubular member 9 made of metal which is inserted into a U-shaped sheet metal member 16 arranged in the backrest 1 and which is joined therewith through welding. The lower end of the tubular member 9 is closed by an end cap 17 which forms the base for a compression-type spring 18 arranged inside the tubular member 9. The head 10 of the guide sleeve 5, which is made of a plastic material, is fastened to the upper end of the tubular member by snap-fit. On the bottom of the recess 11 in the head 10 there is a latch pin 19 which is subjected to the bias of a spring and thereby exerts a pressure onto the bar 4 inserted into the guide sleeve 5 whereby this bar 4 is retained in the selected position. The latch pin 19 is connected with the operating lever 8 and can be withdrawn, through actuation of said operating lever 8, into the wall of head 10.

FIG. 3 illustrates the support bar 4 in a position which it assumes when the headrest is in the storage position. The lower portion 13 of the bar is disposed inside the tubular member 9 and is retained in its position by the latch pin 19 against the force exerted by the compression-type spring 18. In this position, the pivot joint 14 is located in the recess 11 inside the head 10, and the upper bar portion 12 is folded down rearwardly and extends through the lateral opening of the recess 11.

To move it into the head support position, the headrest together with the upper portion 12 of the bar 4 is pivoted manually into an upright position. This will cause the latch pin 19 to be pushed by the portion 12 of the bar 4 into the wall of the head 10. The headrest is then pushed downwardly, which will cause the bars 4 to be pushed into the guide sleeves 5 and the compression springs 18 arranged below the bars to be preloaded. During this operation, the pivot joints 14 are displaced downwardly inside the tubular members 9 to a position in which they are locked by the tubular members 9 so that the portions 12 of the bar 4 cannot be folded down any more. In this position, the portions 12 of the bar 4 are lockable through the latch pin 19 and are thereby retaining the headrest in the selected head support position.

The operation of folding down the headrest may be carried out in a simple manner through actuation of the operating lever 8. This will release the portions 12 from the latch pin 19 and enable the compression springs 18 to urge the rods 4 upwardly to a point where the pivot joints 14 are located outside the tubular member 9 so that the portions 12 of the bar 4 can be folded down rearwardly of the seats. The folding down operation is assisted by the latch pin 19, because it exerts a force on the bar portion 12 in the fold-down direction. Thus, a momentary actuation of the operating lever 8 is all that is needed to move the headrest from the head support position into the storage position.

Figure 4:
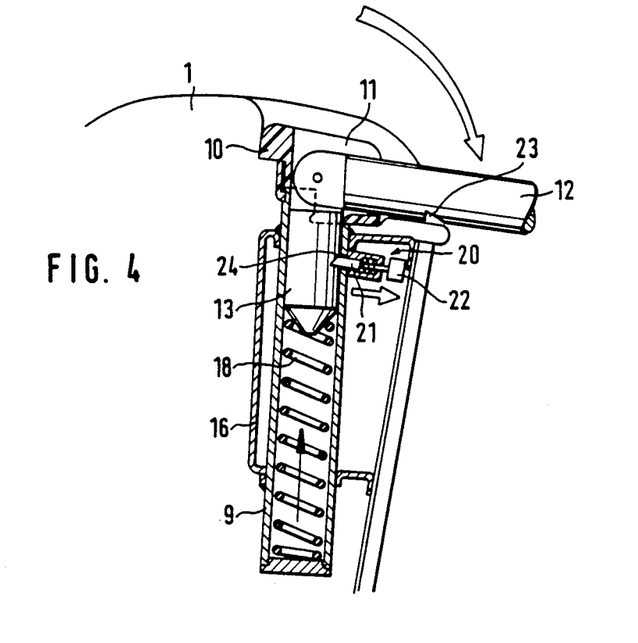
FIG. 4 is a longitudinal sectional view of the headrest mounting arrangement according to the invention, including a mechanical adjusting mechanism and a solenoid operated unlocking device.

The exemplary embodiment illustrated in FIG. 4 corresponds to that of FIG. 3, except for the latching mechanism. Therefore, those elements which are identical to the ones illustrated in FIG. 3 are identified by like numerals. The latching mechanism 20 in the embodiment illustrated in FIG. 4 is comprised of a spring-loaded locking pawl 21 which is adapted to be moved by a solenoid 22 into an unlocking position. The solenoid can be energized by a switch secured to the dashboard of the vehicle. The rod portions 12, 13 have formed therein notches 23, 24, respectively, which are engaged by the locking pawl 21 to retain the respective rod portion in the storage or the head support position. Except for the electric remote control, the operation of the headrest illustrated in FIG. 4 is the same as in the exemplary embodiment described earlier.

Figure 5:
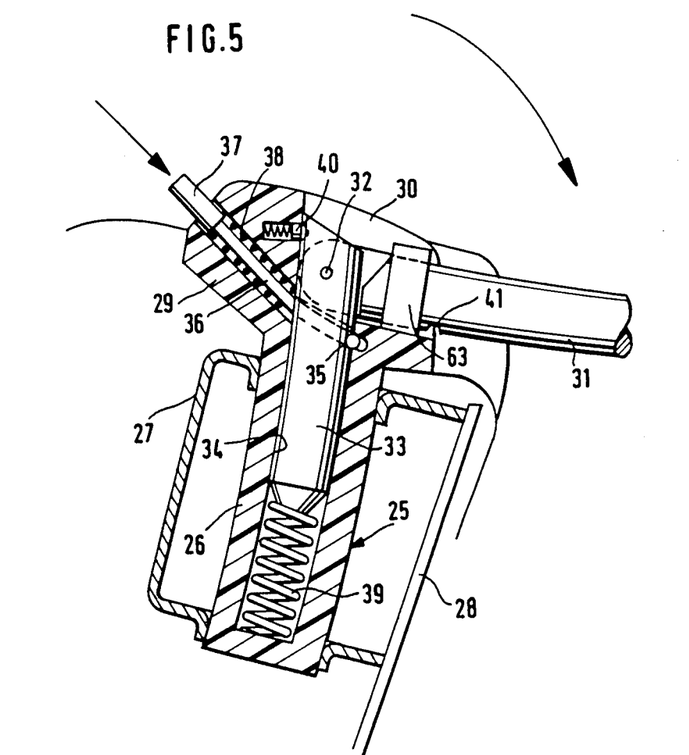
FIG. 5 a longitudinal sectional view of a headrest mounting arrangement with a plastic housing and push button operated unlocking means.

In the headrest mounting arrangement illustrated in FIG. 5, a plastic housing 25 is being employed which has a tubular portion 26. The portion 26, which functions as a guide sleeve, is secured to a profiled sheet metal member 27 of a backrest 28. The plastic housing 25 also has a head 29 which forms the upper end thereof. The head 29 has a rearwardly open recess 30 formed therein for receiving the upper rod portion 31 when the same is tilted downwardly. A U-shaped elastomeric member 63 is arranged in the recess 30 and serves as a support for the rod portion 31 when the same is in the folded down position as illustrated in the drawing. The rod portion 31 is connected, by means of a pivot joint 32 of the type to be described in conjunction with FIG. 7, with a lower rod portion 33 which is mounted in the bore 34 of the plastic housing 25 and which has a lateral groove 35 into which engages, in the position illustrated in the drawing, an arcuate locking member 36 so that the rod portion 33 is prevented from slipping out of the bore 34. The arcuate locking member 36 is connected with a push button 37 which is biased by a spring 38 in the direction opposite to push button actuation. Actuation of the push button 37 will enable the arcuate locking member 36 to be moved out of the groove 35 and the rod portion 33 to be unlocked. A compression spring 39 inserted between the lower end of the rod portion 33 and the bottom of the bore 34 serves to urge the rod portion 31 out of the bore 34 when the headrest is being folded down. The operation of tilting down the rod portion 31, after the pivot joint has been unlocked, is being effected by a mushroom-shaped thrust element 40 which exerts a pressure in the fold-down direction onto the lateral surface area of the rod portion 31 in the region directly above the pivot axis of the pivot joint 32.

In order to move the headrest of the FIG. 5 embodiment from the illustrated storage position into the head support position, the rod portion 31 is tilted upwardly by hand until it engages the bottom of recess 30, which will cause the thrust element 40 to be moved back against the bias of the spring into its bore formed in the head 29. Subsequently, the headrest is pushed downwardly and the rod portions 31, 33 are urged into the bore 34 which will cause the spring 39 to be compressed. The arcuate locking lever 36, due to its inclined disposition with respect to the axis of bore 34, can then be easily pushed out of the groove 35. Once the headrest has assumed the desired position, the locking lever 35 will engage in a groove 41 formed in the rod portion 31 whereby the headrest will be locked into position. Alternatively, a plurality of grooves may be provided, one spaced at a distance above the other, which would enable the headrest to be locked into selective head support positions.

In order to fold down the headrest, the push button 37 is actuated which will cause the rod portion 31 to become unlocked. The compression spring 39 will then urge the rod portions 31, 33 together with the headrest upwardly until the locking lever 36 engages into the grooves 35, as illustrated in the drawing. After the pivot joint 32 has emerged out of the bore 34 and is not locked any longer, the rod portion 31 is pushed rearwardly, which will cause the headrest, aided by its own weight, to drop into the storage position.

Figure 6:
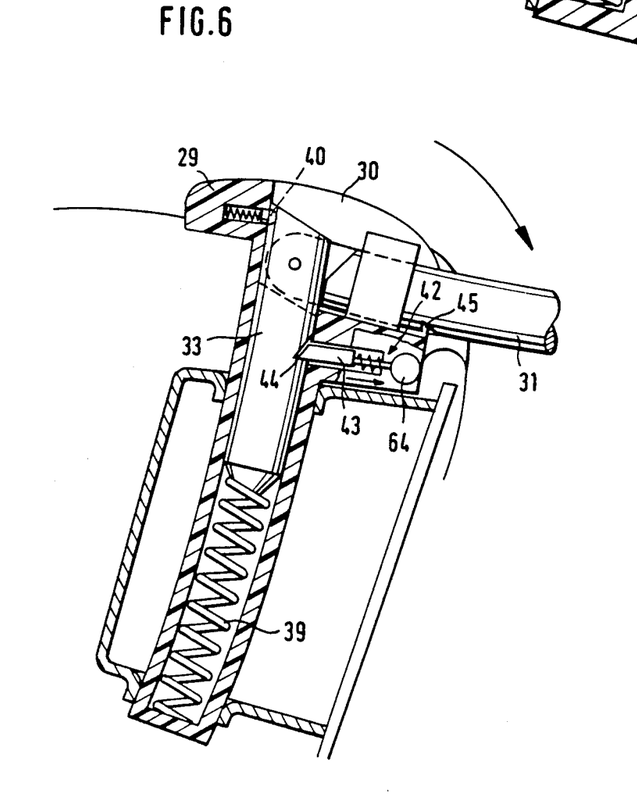
FIG. 6 is a headrest mounting arrangement according to the invention with a plastic housing and solenoid operated unlocking means.

FIG. 6 illustrates a headrest mounting arrangement which is basically the same as that illustrated in FIG. 5, except that, for the purpose of facilitating the control of the headrest, the mechanical push button arrangement has been replaced by an electromagnetically unlockable latching mechanism 42 which can be controlled from a dashboard or console mounted switch. The latching mechanism 42 is accommodated in the head 29 below the slot 30 and is comprised of a spring-biased locking pawl 43 which coacts with a notch 44 formed in the rod portion 33 and a notch 45 formed in the rod portion 31. The locking pawl 43 is connected with a solenoid 64 which, when energized, will cause the locking pawl 43 to be withdrawn from a notch. The locking pawl 43 is of saw tooth-like configuration so that the rod portion 33, when being moved into the bore, is able to move the locking pawl 43 back and out of the way. Except for the remote controlled solenoid operation, the manner of operation of this headrest arrangement corresponds to the one illustrated in FIG. 5.

Figures 7A, 7B:
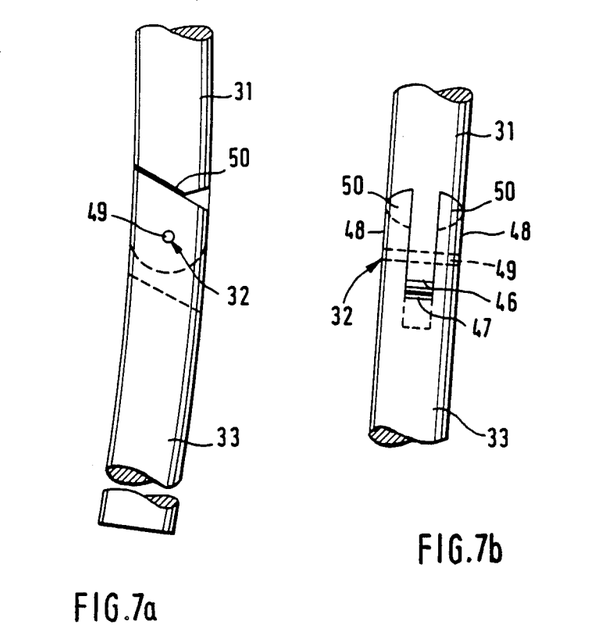
FIGS. 7a and 7b are respectively front and side elevational views of the pivot joint of a bar for the support of a headrest.

FIGS. 7a and 7b illustrate the pivot joint 32 between the rod portion 31 and 33. It is comprised of an end 46 of the rod portion 31 which is flattened on both sides and which is adapted for engagement into a slot 47 in the end of the rod portion 33. The flattened end 36 of the rod portion 31 fits between the webs 48 which define the slot 47 and are interconnected by a pivot pin 49 which is arranged on the axial center line of the rod portion and which extends perpendicularly to the plane of the slot 47. The hinge pin 49 is retained by press fit in aligned bores formed in the webs 48 and extends through a bore formed in the end 46. In the stretched-out position of the pivot joint 32, the end faces 50 of the webs 48, which are angled with respect to the axial center line of the rod portions 31, 33, are engaging the opposing, correspondingly angled surfaces of the rod portion 31 and are thereby forming a stop means which locks the pivot bearing 32, when the rod portions 31, 33 are in the stretched-out position, in the direction opposite the direction of fold-down movement. This will facilitate upward tilting of the headrest and downward displacement thereof into the head support position.

Figure 8A:
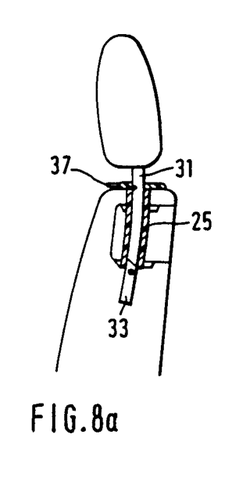
FIGS. 8a, 8b, and 8c are schematic views illustrating the course of movement taken by the subject headrest between the head support position and the storage position.
Figure 8B:
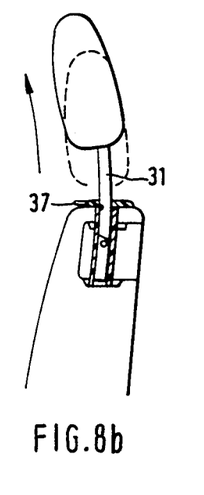
Figure 8C:
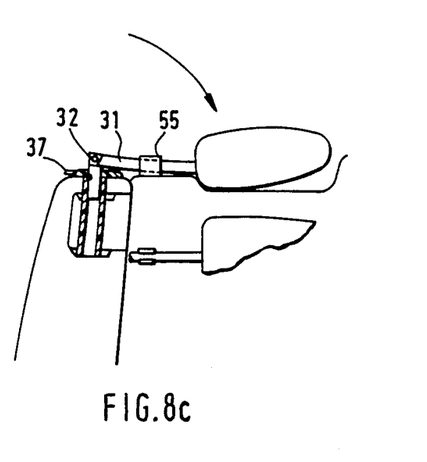

The path of movement followed by the headrest during the fold-down operation is illustrated in FIGS. 8a, 8b and 8c, reference being made to the exemplary embodiment according to FIG. 5. FIG. 8a shows the headrest in the head support position. The rod portion 31 engages deep into the housing 25 and is therefore retained securely in position. Actuation of the push button 37 will cause the rod portion 31 to be unlocked and to move the headrest upwardly, as shown in FIG. 8b. As soon as the pivot joint is unlocked, the headrest will drop rearwardly and thus assumes its storage position, as shown in FIG. 8c.

Figures 9, 10:
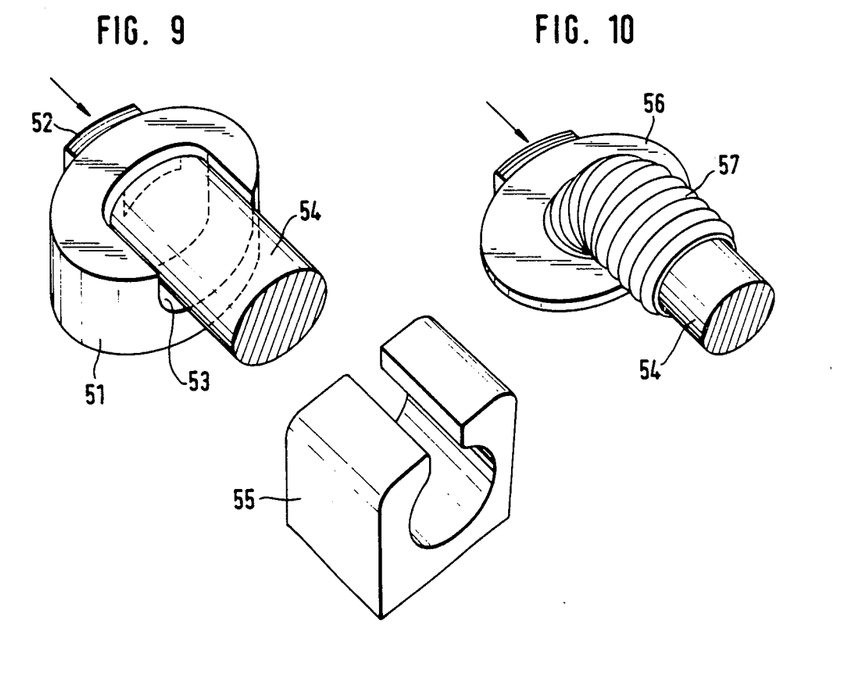
FIG. 9 is a perspective view of a push button arrangement used for actuating the subject headrest.
FIG. 10 is a perspective view of a bellows arrangement for the pivot bearing of the subject headrest.

FIG. 9 illustrates a cylindrical head 51 which forms the upper end of the tubular member of a foldable headrest mounting arrangement. The head 51 has on its forwardly facing side a push button 52 for releasing the locking mechanism, and a recess 53 at the rear thereof for guiding the foldable rod portion 54. The head 51 may be used in combination with a recipient member 55 made, for instance, of an elastomeric material such as rubber. The recipient member 55 serves to accommodate the rod portion 54 when the headrest is in the storage position.

In the exemplary embodiments described in the foregoing, the pivot joint 14, 32 is surrounded, when the headrest is in the storage position, by the walls of the recesses 11 or 30 in the head 10 or 29, respectively, so that there are no sharp edges projecting into the occupant compartment that may cause injuries to the passengers. Another approach that may be taken in providing a shield around the pivot bearing is shown in the embodiment illustrated in FIG. 10. Here, a bellows 57 of an elastic material, which is secured to the head 56, is used to enclose the pivot joint as it emerges from the head 56 during the headrest fold-down operation, so that potential injuries to the passengers are effectively eliminated. The bellows 57 also serves as a means to protect the joint and the guide sleeve against dust and dirt.

Figure 11:
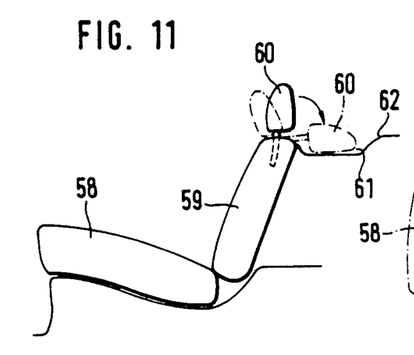
FIGS. 11 and 12 are schematic views illustrating the employment of the subject headrest in combination with foldable backrest.
Figure 12:
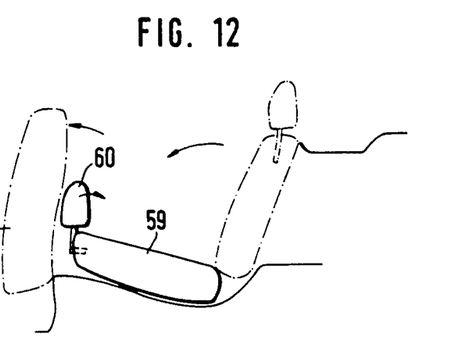

FIGS. 11 and 12 illustrate the employment of the subject headrest in a vehicle with foldable rear seats. In FIG. 11, the seat cushion 58 and the backrest 59 of the rear seat are in the normal position. The headrest 60 is adapted to be moved through push-button actuation, in a manner described in the foregoing, from the upright head support position into the storage position. In this position, the headrest lies in a compartment 61 formed in the utility shelf 62 located behind the rear seat 59, an arrangement which will afford the driver a better view towards the rear.

If the rear seat is to be knocked down to gain more luggage space, the seat cushion 58 and the backrest 59 are successively moved into the position illustrated in FIG. 12. By folding down the headrest 60, the pivoting radius of the backrest 59 can be reduced to a dimension which enables the backrest 59 together with the headrest 60 to be accommodated within the space that is dictated by the width of the seat cushion.

Figure 13:
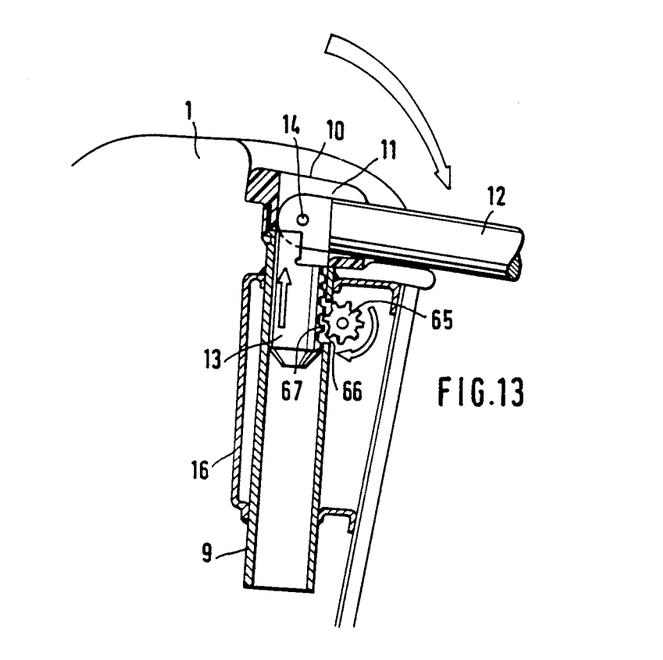
FIG. 13 is view of a headrest according to FIG. 1 with an electric drive mechanism.

FIG. 13 illustrates another embodiment of a headrest mounting arrangement in which the tilting of the headrest is effected by means of an electric motor, rather than by the force of a spring. Inasmuch as this headrest mounting arrangement corresponds, by and large, to the one illustrated in FIG. 3, like elements have been assigned like numerals. Instead of the compression spring that is being used in the exemplary embodiments described earlier for pushing the upper rod portion 12 out of the guide sleeve, this embodiment employs a gear 65 which is adapted for rotation about a horizontal axis and which is driven in clockwise direction by an electric motor. The gear 65 engages through an opening 66 formed in the tubular member 9 with the toothing of a toothed rack formed in the lower rod portion 13. This arrangement enables, upon actuation of a timed electric motor which drives the gear 65, the rod portion 13 to be elevated to a position in which it, together with the headrest mounted thereon, drops into the storage position. As in the other exemplary embodiments, the operation of tilting the headrest back into its upright position is carried out manually, whereby the electric drive mechanism, which is not of the self-locking type, is being returned to its initial position.

In the embodiments described above, the headrest may be moved automatically into the storage position, but the operation of returning the headrest into its upright position must be carried out manually. This does not constitute a great disadvantage, because the head support position is only used when the rear seats are occupied. It is then up to the passengers which enter the car to occupy the rear seat to erect the headrest so as to move it into its head support position. The comfort factor can be increased if, as illustrated in the embodiment according to FIG. 14, the headrest arrangement includes an electric drive mechanism which is adapted to move the headrest not only into the storage position, but also into the head support position. This is accomplished in that the two support rods 68 for the headrest are secured to a horizontally extending shaft 70 which is mounted in the backrest 69. The shaft 70 is fixed to the gear 71 for rotation therewith, and a helical threaded shaft 72, which is mounted vertically in the backrest and which is driven by an electric motor 73, is in engagement with gear 71. The drive mechanism formed by the gear 71 and the screw 72 is of the self-locking type. Movement of the headrest is effected by an electric motor which is turned on by a switch mounted, for instance, on the dashboard. The arrangement is of the type which permits the electric motor to be driven in both directions and wherein the operating time for the electric motor can be preset. Once the headrest has assumed its end position in one or the other direction of movement, an "off" switch causes the control command to be canceled.

Figure 14:
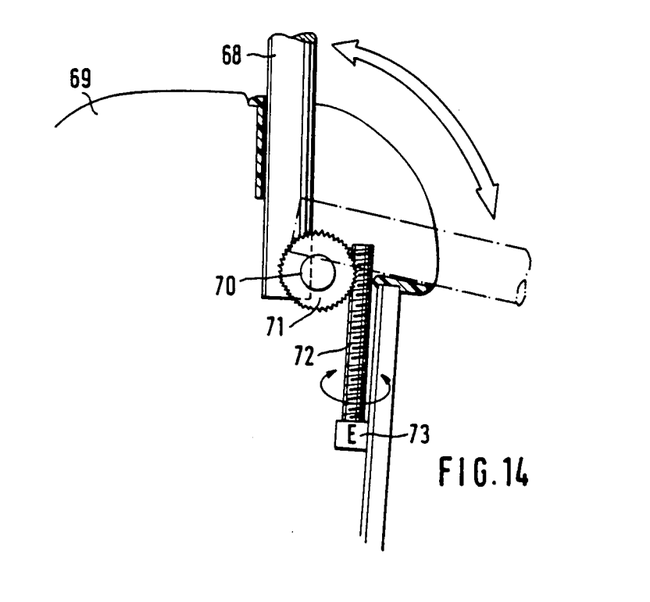
FIG. 14 is a view of the subject headrest with electric remote control for movement from the head support position into the storage position and vice versa.

The headrest arrangement described above enables a headrest to be folded down and to be erected by remote control. Since the drive is of the self-locking type, headrest movement can be stopped in any intermediate position, and it is therefore possible to selectively adjust the headrest, by remote control, into various tilting positions.

The embodiments of the invention in which an exclusive property or priviledge is claimed are defined as follows:

1. A foldable headrest arrangement for the backrest of a vehicle seat:
   a rod supporting the headrest and having an upper rod portion connected to the rod by an unlockable pivot joint to permit the head rest and upper rod portion to be folded down,
   a sleeve-like guide means provided at the upper portion of the seat backrest and receiving the rod,
   a lift mechanism provided in the backrest including a preloaded spring contained within the sleeve-like guide means to permit manual slidable insertion of the rod into the sleeve-like guide means to lock the unlockable pivot joint and activate the lift mechanism, said spring acting to raise the rod to a position in which the pivot joint is unlocked,
   a latching device adapted to retain the rod in the position of insertion within the sleeve-like guide means,
   and a solenoid adapted to unlatch the latching device and being controlled by a circuit arranged in the vehicle.

2. A foldable headrest arrangement for the backrest of a vehicle seat:
   a rod supporting the headrest and having an upper rod portion connected to the rod by an unlockable pivot joint to permit the head rest and upper rod portion to be folded down,
   a sleeve-like guide means provided at the upper portion of the seat backrest and receiving the rod,
   a lift mechanism provided in the backrest including a preloaded spring contained within the sleeve-like guide means to permit manual slidable insertion of the rod into the sleeve-like guide means to lock the unlockable pivot joint and activate the lift mechanism, said spring to raise the rod to a position in which the pivot joint is unlocked,
   a latching device adapted to retain the rod in the position of insertion within the sleeve-like guide means,
   and a thrust element mounted on the sleeve-like guide means in the region above the unlocked pivot joint acting upon the rod to urge the rod in the fold down direction when the latching device is released and the lift mechanism raises the rod out of the sleeve-like guide means.

3. Headrest according to claim 2, the improvement comprising:
   the thrust element being a tappet-like element which is adapted to be urged against the force exerted by a compression spring into a transverse bore of the guide means.

4. Headrest according to claim 2, the improvement comprising:
   the rod when being in the folded down position, being supported and partially embraced by an elastomeric member.

5. Headrest according to claim 4, the improvement comprising:
   the elastomeric member being arranged in the recess formed in the head of the guide means.

6. Headrest according to claim 2, the improvement comprising:
   the lower rod portion being a toothed rack provided with toothing into which engages the pinion gear of an electrically operated mechanism which is arranged in the backrest.

7. Headrest according to claim 2, the improvement comprising:
   the lower end of the rod being fixedly connected with a gear for rotation therewith, said gear being mounted in the backrest and being adapted to be driven, both in clockwise and anti-clockwise direction, by a self-locking screw which is driven by an electric motor.

8. Headrest according to claim 7, the improvement comprising:
   the screw being mounted in the backrest in an upright position.

* * * * *